United States Patent
Casey

(10) Patent No.: US 8,891,439 B2
(45) Date of Patent: Nov. 18, 2014

(54) METHOD FOR OPERATING MULTI-DOMAIN PROVIDER ETHERNET NETWORKS

(71) Applicant: Rockstar Consortium US LP, Plano, TX (US)

(72) Inventor: Liam Casey, Ottawa (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 13/922,843

(22) Filed: Jun. 20, 2013

(65) Prior Publication Data

US 2013/0279511 A1    Oct. 24, 2013

Related U.S. Application Data

(63) Continuation of application No. 13/679,500, filed on Nov. 16, 2012, now Pat. No. 8,559,363, which is a continuation of application No. 12/340,817, filed on Dec. 22, 2008, now Pat. No. 8,325,732.

(51) Int. Cl.
| | |
|---|---|
| *H04W 4/00* | (2009.01) |
| *H04L 29/06* | (2006.01) |
| *H04L 12/46* | (2006.01) |
| *H04L 12/28* | (2006.01) |

(52) U.S. Cl.
CPC ............ *H04L 12/2856* (2013.01); *H04L 63/08* (2013.01); *H04L 12/4662* (2013.01); *H04L 12/4633* (2013.01); *H04L 12/4658* (2013.01)
USPC ........... 370/327; 370/329; 370/338; 370/340; 370/397; 370/399; 370/395.3; 370/401

(58) Field of Classification Search
USPC ......... 370/327, 329, 338, 340, 409, 411, 474, 370/475
See application file for complete search history.

(56) References Cited

U.S. PATENT DOCUMENTS

| 6,363,421 B2 | 3/2002 | Barker et al. |
| 6,493,349 B1 | 12/2002 | Casey |

(Continued)

FOREIGN PATENT DOCUMENTS

| WO | 03005648 A2 | 1/2003 |
| WO | 03107604 A1 | 12/2003 |

(Continued)

OTHER PUBLICATIONS

International Search Report and Written Opinion dated Mar. 5, 2010, for International Application No. PCT/CA2009/001676, International Filing date Nov. 25, 2009.

*Primary Examiner* — Alvin Zhu
(74) *Attorney, Agent, or Firm* — Christopher & Weisberg, P.A.

(57) ABSTRACT

A method of enabling extension of a network service of a first domain to a remote customer site hosted by an Access Gateway (AG) in a Provider Ethernet domain. In the first domain, the remote customer site is represented as being hosted by a border gateway (BG) connected to the Provider Ethernet domain, such that subscriber packets associated with the network service are forwarded to or from the remote customer site via the BG. In the Provider Ethernet domain, a trunk connection is instantiated through the Provider Ethernet domain between the host AG and the BG. A trunk cross-connection function is installed in the host AG, for transferring subscriber packets associated with the network service between a respective attachment virtual circuit (AVC) through which the remote customer site is connected to the host AG and an extended AVC tunnelled through the trunk connection. A common service instance identifier (I-SID) is used to identify both the AVC between the host AG and the remote customer site and the extended AVC between the host AG and the BG.

18 Claims, 3 Drawing Sheets

(56) References Cited

U.S. PATENT DOCUMENTS

| | | |
|---|---|---|
| 6,717,944 B1 | 4/2004 | Bryden et al. |
| 7,545,761 B1 | 6/2009 | Kalbag |
| 7,729,303 B2 | 6/2010 | Jiang et al. |
| 7,774,011 B2 | 8/2010 | Sung et al. |
| 7,965,693 B2 | 6/2011 | Jiang et al. |
| 2003/0142674 A1 | 7/2003 | Casey |
| 2006/0245435 A1 | 11/2006 | Sajassi |
| 2008/0159309 A1 | 7/2008 | Sultan et al. |

FOREIGN PATENT DOCUMENTS

| | | |
|---|---|---|
| WO | 2008070957 A1 | 6/2008 |
| WO | 2008070959 A1 | 6/2008 |
| WO | 2008089305 A2 | 7/2008 |

METHOD FOR OPERATING MULTI-DOMAIN PROVIDER ETHERNET NETWORKS

CROSS-REFERENCE TO RELATED APPLICATIONS

This application is a continuation of U.S. patent application Ser. No. 13/679,500 filed Nov. 16, 2012, which is a continuation of U.S. patent application Ser. No. 12/340,817 filed Dec. 22, 2008, now U.S. Pat. No. 8,325,732, issued Dec. 4, 2012.

MICROFICHE APPENDIX

Not Applicable.

TECHNICAL FIELD

The present invention relates to management of traffic forwarding in Provider Ethernet networks, and in particular to methods of extending Virtual Private Network (VPN) network services across a multi-domain Provider Ethernet network.

BACKGROUND

Network operators and carriers are deploying packet-switched communications networks in place of circuit-switched networks. In packet-switched networks such as Internet Protocol (IP) networks, IP packets are routed according to routing state stored at each IP router in the network. Similarly, in Provider Ethernet networks, Ethernet frames are forwarded according to forwarding state stored at each Ethernet switch in the network. In this document, the terms "packet" and "packet-switched network", "routing", "frame" and "frame-based network", "forwarding" and cognate terms are intended to cover any PDUs, communications networks using PDUs and the selective transmission of PDUs from network node to network node.

The modern packet network space is composed of multiple autonomous domains, each of which is managed by an independent network operator entity. For the purposes of understanding the present disclosure, an "autonomous domain" should be understood to refer to a collection of connected network elements, including, but not restricted to Ethernet Switches, under control of a network operator. In Internet Protocol (IP) networks, autonomous domains are referred to as "autonomous systems", and may in fact be controlled by more than one entity. In Ethernet networks, an autonomous domain may be referred to as a sub-network, or simply a network. However, in all cases, customers (or subscribers) access the autonomous domain under the terms of a service agreement with the network operator that controls the specific domain to which the customer wishes to connect. Typically, an autonomous domain is connected to one or more adjacent autonomous domains via one or more border gateway devices, which may enable a customer to exchange packets with network addresses outside of the specific domain to which the customer is connected.

In the provision of services such as Virtual Private Network (VPN) service, a customer will have two or more sites which are desired to be linked using a given network service instance. For example, a company may have sales offices at multiple locations, and desire to connect all of these offices using an Ethernet multi-point to multi-point (known as ELAN) service instance. If all of the customer sites are located within the territory served by a single autonomous domain, then it is a simple matter for the domain's network operator to provide the desired service to all of the customer's sites. However, it often happens that the customer's sites are geographically dispersed to such an extent that they cannot all be directly connected to the same autonomous domain. For example, a company may have sales offices in multiple different countries, and each sales office will necessarily connect to an autonomous domain that covers the region in which that office is located. In this case, some means must be provided to extend the desired service (e.g. ELAN) across all of the involved autonomous systems.

From the network operators' point of view, extending a service instance across two or more domains requires coordination of packet addressing and labelling schemes (so that, for example, packet traffic identified in one domain as belonging to a specific VPN service instance is properly recognised as such in each of the other involved domains), Operation Administration and Maintenance (OAM) as it pertains to the extended services, customer billing and financial reconciliation between each of the network operators. From the customer's point of view, this coordination should ideally be transparent. Ideally the customer wants to deal with a single service provider for set up, technical support and maintenance, and receive a single invoice.

Known methods of addressing these issues include network federation and negotiation of inter-operator agreements for each service instance. Network federation is a technique in which the network operators controlling one or more autonomous domains agree to unify some aspect of their network OAM functionality. For example, the allocation of packet labels to network service instances may be co-ordinated into a single cross domain management scheme, so that VPN traffic can be properly recognised and handled in each of the federated networks (or domains). Inter-operator agreements can be used, for example, to provide uniform bandwidth allocation to a specific service instance across multiple domains, and reconciliation of charges between the involved operators. When the number of domains in a federation, and/or the number of customers that require services that span multiple domains, is limited, these arrangements are generally satisfactory. However, successful federation of autonomous domains become increasingly complex as the number of member domains increases. Similarly, negotiation of inter-operator agreements for each service instance, and the subsequent co-ordination of provisioning and billing, becomes increasingly complex and onerous as the number of customers requiring multi-domain services, and as the number of involved domains, increases.

Techniques for extending network services of a first domain to a remote customer site in a Provider Ethernet domain, which overcome at least some of the above-noted issues remain highly desirable.

SUMMARY OF THE INVENTION

Thus, an aspect of the present invention provides a method of enabling extension of a network service of a first domain to a remote customer site hosted by an Access Gateway (AG) in a Provider Ethernet domain. In the first domain, the remote customer site is represented as being hosted by a border gateway (BG) connected to the Provider Ethernet domain, such that subscriber packets associated with the network service are forwarded to or from the remote customer site via the BG. In the Provider Ethernet domain, a trunk connection is instantiated through the Provider Ethernet domain between the host AG and the BG. A trunk cross-connection function is installed in the host AG, for transferring subscriber packets associated with the network service between a respective attachment virtual circuit (AVC) through which the remote customer site is connected to the host AG and an extended AVC tunnelled through the trunk connection. A common service instance identifier (I-SID) is used to identify both the AVC between the host AG and the remote customer site and the extended AVC between the host AG and the BG.

With this arrangement, the first autonomous domain operates as the "home" domain of a network service instance and controls traffic forwarding related to the network service instance according to the procedures of the specific network service type. Thus, for example, for an ELAN service instance customer Ethernet packets will be forwarded across the first domain based on the customer MAC destination address field in the packet, while for an IP VPN service customer packets will be forwarded across the first domain according to the customer destination IP address. Similarly, the first domain's network operator assumes responsibility for OAM of the service, as well as service-related interactions with the customer. The second domain provides a simple aggregation and trunking service to the first domain, so that subscriber traffic to or from remote customer sites, which are located within the second domain, can be transparently tunnelled through the second domain without the second domain having to be aware of the network service(s) types or instances with which that traffic is associated. At the same time, the second domain's network operator can easily monitor traffic within the trunk connections (e.g. by providing a policy enforcement point, PEP, at the BG of the second domain) for both policy enforcement and for billing purposes.

Advantageously, the trunk flow paths between AGs within the second domain and the BG of the first domain can be set up in advance, so that connectivity and invoicing reconciliation do not have to be renegotiated between the involved network operators for each new customer site added to a network service instance.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

In very general terms, the present invention provides a method of enabling extension of network services instantiated in a first network domain to remote customer sites in a link state controlled network domain.

For ease of description, methods in accordance with the present invention will be described herein with reference to a representative embodiment deployed in a Provider Ethernet network domain, such as, for example, any of Provider Link State Bridging (PLSB), Provider Backbone Transport (PBT), Provider Backbone Bridging-Traffic Engineering (PBB-TE), and Provider Backbone Bridging (PBB) network environments. However, while the domain designated below as the foreign domain is required to support Provider Ethernet network technologies, it will be understood that the present invention is by no means limited to such network technologies for the domain offering the network service. Rather, those of ordinary skill in the art will be readily able to apply the present teaching to other network environments, and all such implementations are considered to fall within the intended scope of the appended claims.

Figure 1:
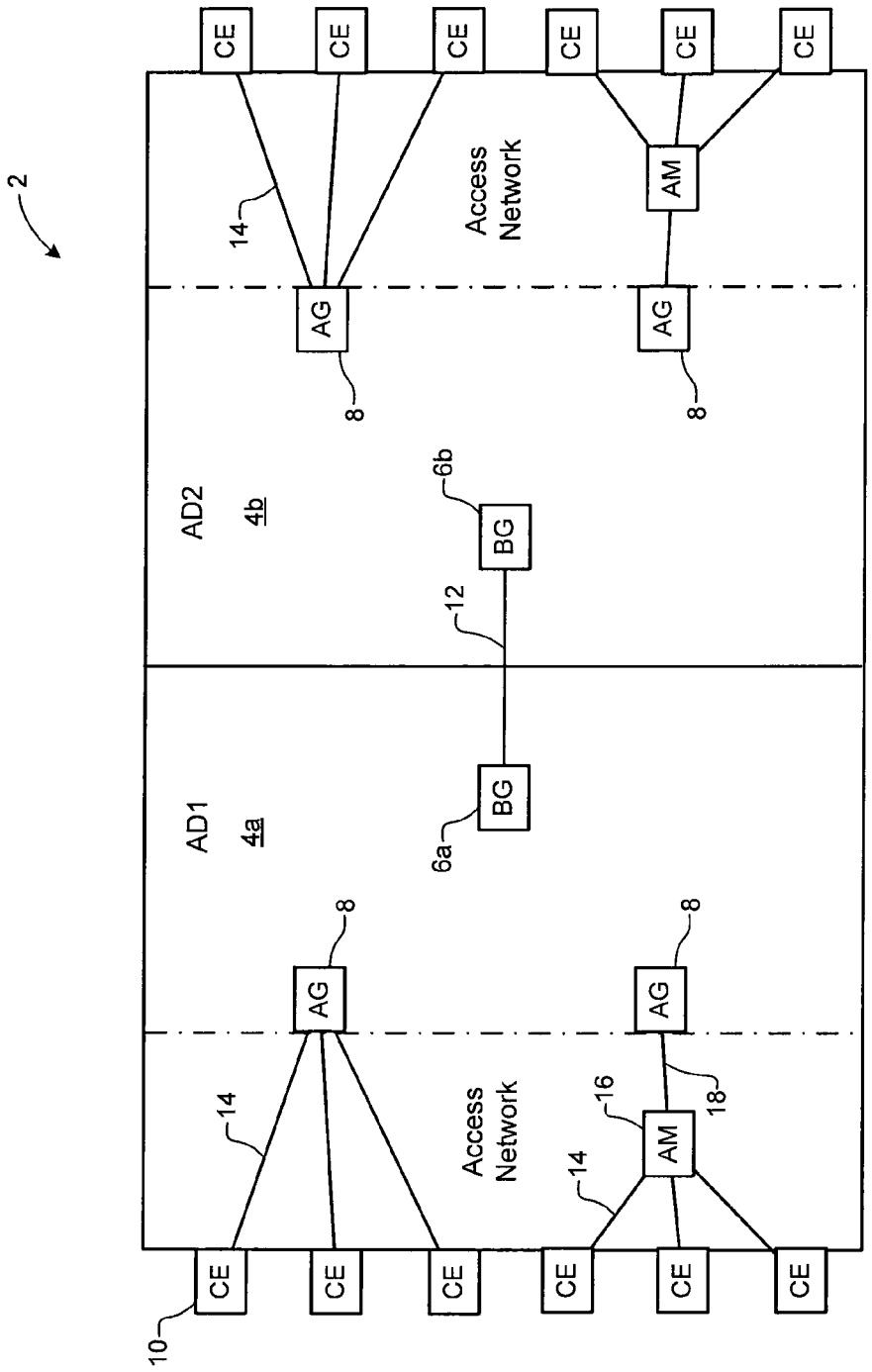
FIG. 1 is a block diagram schematically illustrating a multi-domain network in which techniques in accordance with the present invention may be implemented.

Referring to FIG. 1, a multi-domain network 2 is shown, in which adjacent domains 4a-b are connected via Border Gateways (BGs) 6. Within each autonomous domain (AD) 4, a respective set of one or more Access Gateways (AGs) 8 are provided for hosting customer sites 10, so that users at each site can access services of the network. Typically, a respective BG 6 will be provided by each autonomous domain (AD) 4, and interconnected by an inter-BG link 12. In some embodiments the inter-BG link may be an Ethernet link. In other embodiments, the inter-BG link 12 may be a multi-hop trunk (which may traverse a third network (not shown)) capable of transporting Ethernet packets BGs. In a Provider Backbone Transport (PBT) network environment, the inter-BG link 12 will normally be a PBT trunk known in the art. Alternatively the inter-BG link may be defined as a PBB source-destination flow over an Ethernet Link or Provider Backbone Bridges network, also known in the art. With these arrangements, each BG will forward over the inter-BG link 12 Provider Ethernet encapsulated traffic destined for the other autonomous domain when the Backbone destination address (B-DA) of the Provider Ethernet packet is the MAC address of the other BG or another node to which that BG bridges.

In a PLSB, PBT or PBB network environment, both AGs 8 and BGs 6 may be Provider Ethernet Backbone Edge Bridges (BEBs), and distinguished primarily by their respective roles.

Typically, a customer site 10 is connected to the network via an attachment circuit between customer equipment (e.g. a router or a server at the customer premise) and an AG 8 selected by the network operator. For specific types of network, an AG is also known as a Provider Edge (PE), Service Edge, Broadband Remote Access Server (BRAS) or other network type specific name. It is the network element that inter works between a service agnostic access (or attachment) subnet and the service aware core network of a domain. In some cases, the attachment circuit is provided as a physical link 14 (e.g. wire-line, optical fiber or fixed wireless) between the customer equipment and the AG 8. In other cases, the customer equipment is physically connected to an Aggregation Mux (AM) 16, which is connected to the AG 8 by an access trunk connection 18. In this case, the connection between the customer equipment and the AG 8 is a virtual link through the Aggregation Mux 16, and may be referred to as an attachment virtual circuit (AVC). For the purposes of the present disclosure, attachment circuits and attachment virtual circuits (AVCs), are considered to be equivalent, and the terms are used interchangeably. In a Provider Ethernet network environment, the access trunk connection 18 between the Aggregation Mux (AM) 16 and the Access Gateway (AG) 8 may be a PBT trunk or may be PBB encapsulated Ethernet flows.

Typically, the network operator will assign an identifier to each customer site, and this identifier will commonly be associated with the access circuit between that customer site and its host AG 8, so as to uniquely identify traffic to or from the customer site. In the case of Provider Ethernet network environments, this identifier may be the service instance identifier (I-SID). An I-SID may also identify a network service instance set up by the network operator under the terms of its contract with the customer. For the purposes of this disclosure the totality of Provider Ethernet Backbone VLAN Identifier (B-VID), Backbone Source Address (B-SA), Backbone Destination Address (B-DA) and I-SID that encapsulate customer packets as they are transported on the AVC define a customer virtual User Network Interface (UNI) port at the AG. With this arrangement, the AG 8 hosting a given customer site can use the I-SID assigned to that site's AVC to map traffic arriving on the virtual UNI port to the customer's network service instance and to determine the B-VID, B-SA and B-DA of the access trunk connection through which the AVC is tunnelled when packets are to be transmitted to the customer site. Note that, in conventional network environments, the network service instance set up for the customer will be limited to the respective domain controlled by the network operator. This service instance, and its associated traffic flows, will not normally be recognised in other domains except within a federation or under the terms of a corresponding service agreement negotiated by the network operators whose cooperation is needed to deliver the service to the customer.

Techniques in accordance with the present invention enable a network service instance (such as virtual private network, VPN) instantiated in a first domain to be extended to remote customer sites in a Provider Ethernet domain.

Figure 2:
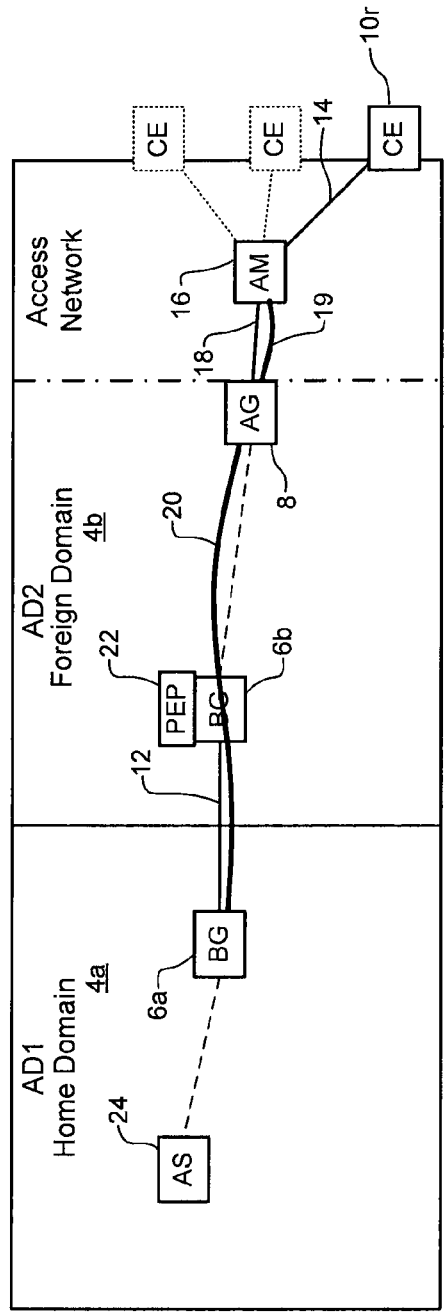
FIG. 2 is a block diagram schematically illustrating implementation of an extended network service instance in the network of FIG. 1, in accordance with an embodiment of the present invention.

Referring to FIG. 2, a network service is instantiated in a first autonomous domain (AD1) 4a, and a customer site 10r in an adjacent autonomous domain (AD2) 4b wants to be connected to this network service instance. For convenience of description, the first domain (AD1) 4a is designated as the "home" domain for the network service, and the second domain (AD2) 4b is designated as a "foreign" domain. In the illustrated example, both domains 4a-b are Provider Ethernet network domains, for ease of description. However, while the foreign domain must support Provider Ethernet techniques, this same limitation does not apply to the home domain. The selection of the home domain can be based on any desired criteria. For example, the network of the operator who receives a request to provide the network service instance from the customer, may assume the role of home domain.

Within any given domain, customer sites, servers, trunk connections and the like are considered to be "local" to that domain, whereas those within the other domain are considered to be "remote".

The home domain's network operator assumes the customer-facing roles of interacting with the customer to negotiate service agreements, user authentication, invoicing, technical support and Operation Administration and Management (OAM) of the service instance. In addition, the home domain assumes performs the network service type specific (address-based) forwarding of packets associated with the network service instance. Thus, the network service for a customer is instantiated as a network service instance in the home domain, and state is installed in the home domain to facilitate forwarding of subscriber packets associated with of the network service instance. The home domain's network operator will also normally designate one or more authentication servers 24 to handle customer site log-in and authentication procedures, so as to provide secure customer access to the network service instance. This authentication server 24 may also operate as an Attachment Mux (AM) or an Access Gateway (AG) hosting one or more local customer sites (not shown in FIG. 2) within the home domain 4a, but this is not essential.

In order to enable the remote customer site 10r to connect to the customer's network service instance in the home domain 4a, the remote customer site 10r is represented in the home domain 4a as being hosted by local BG 6a. With this arrangement, the remote customer site 10r can log onto the authentication server 24, and subscriber packets associated with the network service instance can be forwarded through the home domain 4a to and from the remote customer site 10r, as if the remote customer site 10r was actually a local customer site connected to the home domain. This is advantageous because it allows the home domain to assume sole responsibility for address-based forwarding of subscriber packets of the service instance, including subscriber packets of the service instance being routed to and from the remote customer site 10r, and no alterations in the traffic forwarding protocol of the home domain are required in order to ensure proper forwarding of subscriber packets of the service instance through the foreign domain 4b.

In the case of a Provider Ethernet network environment, representing the remote customer site 10r in the home domain 4a as being hosted by local BG 6a can be implemented by representing the remote customer site 10r as a virtual UNI port of the Inter BG link 12 at the BG 6a. In the illustrated embodiment, this is accomplished by extending the AVC 19 connecting the remote customer site 10r to its host AG 8, in the foreign domain 4b, to the home domain BG 6a, which then performs the interface functions to the home domain network service instance in the same manner that an AG interfaces a non-extended AVC to a local network service instance. With this arrangement, the home domain 4a can control address-based forwarding of all subscriber traffic associated with the service instance, in a conventional manner, as if the remote customer site 10r was located within the home domain 4a.

In this respect, it will be recalled that in network environments in which both the inter-BG link 12 and an access trunk connection 18 between an AG 8 and an AM 16 are able to transport any one or more of PBB, PBT or PLSB trunks, it is possible for the home domain BG 6a to treat an AVC extended through the inter-BG link 12 in a manner directly analogous to the way in which an AG 8 treats an AVC extended through an access trunk connection 18 to an AM 16. In this case, what is required is for the foreign domain to extend the AVC through the inter-BG link 12. This is accomplished by tunnelling the AVC through a trunk connection 20 set up between the AG 8 hosting the remote site 10r and the home domain BG 6a, and by implementing a trunk cross-connection function at the foreign domain AG 8, where the cross-connection function transfers all packets arriving on the regular AVC, tunnelled over trunk 19, to the extended AVC tunnelled over the trunk connection 20, and vice versa. It should be noted that the trunk connection 20 passes through the foreign domain BG 6b and thus the extended AVC also is routed though the foreign domain BG.

Preferably, the trunk connection 20 between the home domain BG 6a and the AG 8 hosting the remote site 10r, is established pursuant to a service agreement negotiated between the respective network operators of the home and foreign domains. For example, the involved network operators may negotiate an agreement in which the foreign domain's network operator agrees to support extended network services instantiated in the home domain. Typically, such an agreement would include policies governing service level (e.g. quality of service guarantees, utilization restrictions etc.) payment reconciliation, etc. Preferably such an agreement would not be tied to any given network service instance or bundle of service instances, but rather would define a set of global parameters within which access in the foreign domain to home domain network service instances could be set up "on the fly". Accordingly, once the agreement has been negotiated between the respective network operators, and an Inter-BG link has been commissioned, the foreign domain's network operator can set up trunk connections 20 between each of the AGs in the foreign domain 4b which may, according to the agreement, host remote customer sites, and the home BG 6a. In an embodiment where the foreign domain is a Provider Ethernet network, the Inter-BG link is Ethernet packet transport capable and the home BG is some form of Provider Ethernet Backbone Edge Bridge, these trunks are defined by the B-MAC addresses of the AG 8 and the home BG 6a and an agreed upon B-VID. In a PBT environment these trunk paths 20 can be configured to satisfy the terms of the negotiated agreement with the home domain, and so can be maintained independently of any given extended network service type or instance. In addition, a policy enforcement point (PEP) 22 can be installed at the foreign domain BG 6b in order to police customer traffic on the individual trunks and/or the aggregate flow over the Inter-BG link and thereby ensure compliance with the negotiated agreement.

The use of Provider Ethernet based trunks is advantageous in that an attachment virtual circuit supporting a given remote customer site 10r can be extended through a PLSB, PBT or PBB trunk between the host AG 8 and the home domain BG 6a and retain the same I-SID in both the access part and the extended part. As with the access connection 18 between the host AG 8 and the AM 16, the I-SID assigned to this extended AVC uniquely identifies subscriber traffic to or from the remote customer site 10r and so can be used to guarantee correct mapping of customer packets to the specific customer's network service instance at the home BG 6a.

In the example of FIG. 2, the remote customer site 10r is connected to its host AG 8 via an access virtual circuit (AVC) which traverses an Aggregation Mux (AM) 16. In the illustrated example the AVC traverses a unique physical link 14 between the remote customer site 10r and the AM 16, and is tunnelled through an access trunk connection 18 between the AM 16 and the host AG 8. In the scenario where the access trunk is a PBB or PBT trunk, it is expedient to implement a trunk cross-connection function in the host AG 8, as described below.

Figure 3:
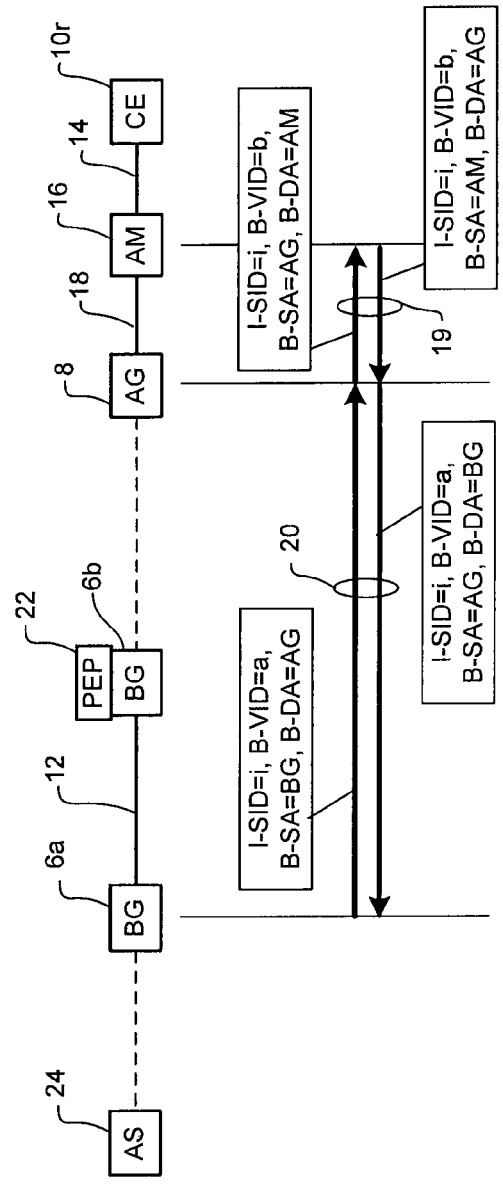
FIG. 3 schematically illustrates a representative trunk cross connect function usable in the extended network service instance of FIG. 2.

In a Provider Ethernet environment subscriber traffic to or from the remote customer site 10r is encapsulated with the B-VID, B-DA and B-SA of the access trunk connection 18 between the AG 8 and the AM 16, and is uniquely identified by the I-SID assigned to the AVC. At the host AG 8, in order to extend the AVC through the PBT trunk to the BG 6b, each incoming packet of the AVC has its B-VID, B-DA and B-SA fields that defined the access trunk connection replaced with the B-VID, B-DA and B-SA fields that define the trunk 20, while retaining the I-SID field unchanged. The values of the replacement fields, having been previously stored in memory of the AG 8, are retrieved using the I-SID value as an index and written into the packet, according to any of many methods well known to the art. The AG 8 then forwards the packet according to its local state for the new B-VID and B-DA. In the example shown in FIG. 3 the access trunk 19 is defined by some B-VID value "b" and the B-DA and B-SA fields containing the B-MAC address of the AM 16 and AG 8. Packets arriving at the AG 8 from the AM 16 will have the B-SA field set to the B-MAC address of the AM 16 and the B-DA set to the B-MAC address of the AG 8 while for packets going to the AM 16 from the AG 8 the values for the B-DA and B-SA fields are reversed. Also in the example of FIG. 3 the trunk 20 between the AG 8 and the home BG 6a is trunk is defined by some other B-VID value "a" and the B-DA and B-SA fields containing the B-MAC address of the home BG 6a and AG 8. Packets arriving at the AG 8 from the home BG 6a will have the B-SA field set to the B-MAC address of the home BG 6a and the B-DA set to the B-MAC address of the AG 8, while for packets going to the home BG 6a from the AG 8 the values for the B-DA and B-SA fields are reversed. Accordingly, the trunk cross-connection function implemented in the host AG 8 uses the I-SID of an incoming packet to identify subscriber traffic that is in an Extended AVC and then swaps out the B-VID, B-DA and B-SA fields of the incoming trunk for the B-VID, B-DA and B-SA fields of the other trunk. For traffic going from the remote customer site 10r to the home BG 6a, the B-VID value of "b" is replaced by "a", the AG B-MAC address is moved from the B-DA field to the B-SA field and the B-DA field is given the B_MAC address of the BG 6a. In order to maintain continuity of the AVC, the trunk cross-connection function implemented in the host AG 8 does not alter the I-SID.

As noted above, AGs and BGs are instances of Backbone Edge Bridges (BEBs), with the primary differences being their respective roles. As such, for the purposes of handling subscriber traffic of extended network services, the home domain BG 6a can emulate an AG, and treat the trunk 20 as if it was an access trunk connection 18 to an aggregation mux (AM) hosting the remote customer site 10r. The home domain BG 6a can also use conventional techniques to advertise the customer address (C-MAC) or addresses of the remote customer site 10r to the home domain 4a as appropriate for the type of network service the customer site has subscribed to. In the home domain 4a, the remote customer site 10r will therefore appear as a virtual UNI port subtending the home domain BG 6a (emulating an AG), and conventional traffic forwarding techniques can be used to properly forward subscriber traffic of the extended service instance to or from the home domain BG 6a on behalf of the remote customer site 10r.

Within the home domain 4a, subscriber traffic of the extended service instance is uniquely identified by an I-SID assigned to the service instance by the home domain operator. The home domain BG 6a can therefore identify subscriber traffic of the extended service instance that is destined for the remote customer site 10r from the I-SID and depending on the network service, the C-MAC, respectively, of received packets. These packets can then be properly forwarded through the foreign domain 4b to the remote customer site 10r, by replacing the I-SID with that of the extended AVC, and encapsulation with the B-VID, B-DA and B-SA of the trunk 20 to the AG 8. Conversely, packets originating from the remote customer site 10r are identified by the I-SID of the extended AVC, and encapsulated with the B-VID, B-DA and B-SA of the trunk 20 as described above. Thus, the home domain BG 6a can provide proper forwarding of these packets into the home domain by de-encapsulating the packets, and replacing the I-SID of the AVC with that assigned to the service instance and forwarding the packets according to rules and local state of the network service instance.

Figure 4:
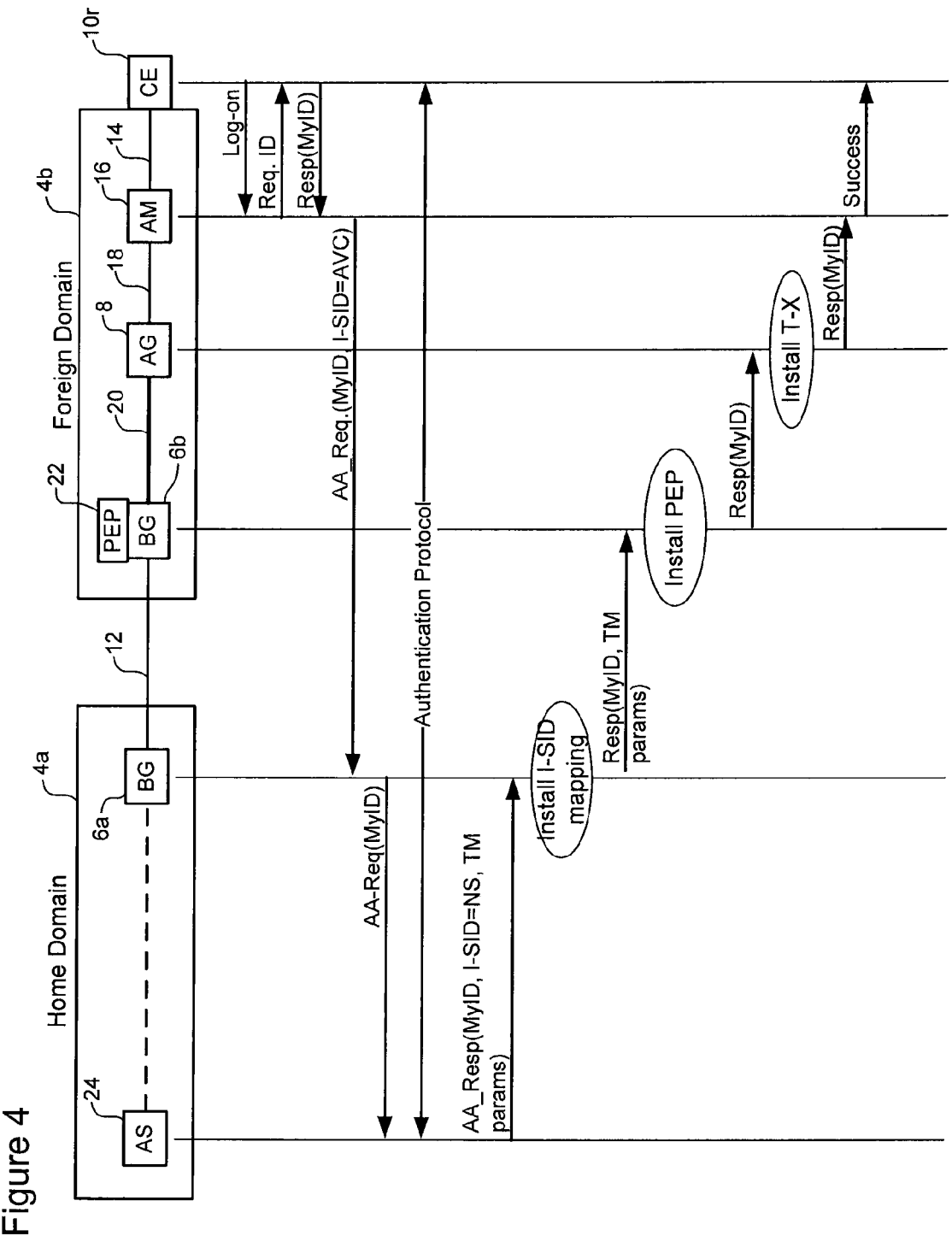
FIG. 4 is a message sequence diagram illustrating an Authentication and Authorization process usable in the extended network service instance of FIG. 2.

FIG. 4 schematically illustrates a representative message flow which may be used to connect the remote customer site 10r to the extended network service in the example of FIG. 2. Referring to FIG. 4, the remote customer site 10r initiates the request to be authorized to use the network in the conventional manner typical for Ethernet connectivity. Thus, for example, a log-on request message may be sent from the remote customer site 10r to the Attachment Mux (AM) 16 which operates, in the terminology of the 802.1X standard (also known as Extensible Authentication Protocol over Ethernet—EAPoE), as an authenticator to request the customer ID, and relay that customer ID to an Authentication Server using a signalling protocol such as RADIUS or DIAMETER, according to the Extensible Authentication Protocol (EAP) procedures. In accordance with the EAP procedures the AM 16 then relays the messages of the authentication exchange between the Authentication Server and the customer 10r. Under normal circumstances, the AM 16 would be configured to use a local Authentication Server (for example) hosted at the AG 8 and, upon successful completion of the log-on and authentication procedures, the customer site would be able to communicate through the network domain it has attached to in accordance with the customer's contract with the domain's network operator.

In some embodiments, the log-on and authentication procedures implemented in the local authentication server are configured to recognise when a customer site wishes to connect to a network service instantiated in another network domain, rather than a local network service instantiated in the local domain. One method of accomplishing this is to include a name for the home domain, as part of the original log-on request message. For example, the original log-on request message sequence may deliver to the local authentication server a client identifier "MyID" of the form "clientID.servicename@homedomain". Such a client identifier can then be parsed by the local authentication server, to extract the home domain name to: identify that the client is trying to connect to a network service instantiated in the other domain; enable the local domain to recognise its role in the communications (i.e. that it is the foreign domain and must therefore tunnel the customers traffic to the other domain); and determine the BG address through which the authentication server designated to handle client authentication and log-on for the network service instance can be reached. In the embodiment of FIGS. 2 and 4, the local authentication server is hosted in the AG 8 and the "homedomain" name is a name that is mapped, by configuration, in the local authentication server to a secure connection to the BG 6b that is connected to the home domain 4a. The BG 6b in turn is configured to relay the authentication exchange messages to its peer BG 6a in the home domain 4a which in turn is able to relay them to an authentication server 24 in the home domain 4a.

Thus in the embodiment of FIG. 4 an Authentication and Authorization (AA) request message is forwarded from the local authenticator (in this case, the AM 16 serving the remote customer site 10r), to the "home" authentication server 24 (eg identified by "servicename@homedomain"). In the illustrated embodiment, the AA Request message contains, as a parameter, an I-SID value chosen by the AM to be assigned to the AVC to be created.

Upon receipt of the request message, the home domain BG 6a forwards the request message through the home domain 4a to the "home" authentication server 24, and installs a "relay" function to facilitate two-way authentication and control messaging between the home authentication server 24 and the remote customer site 10r.

Upon successful completion of the authentication and authorization procedures at the home authentication server 24, a response message is forwarded from the home authentication server 24 back to the remote customer site 10r, and relayed through the home domain BG 6a, foreign domain BG 6b and host AG 8. In the embodiment of FIG. 4, this reply message contains the I-SID assigned to the network service instance in the home domain 4a, as well as traffic management information (such as service agreement identification, bandwidth requirements etc.) so that the foreign domain 4b can allocate appropriate resources to the extended AVC. When the home domain BG 6a receives the response message, it completes attachment of the extended AVC as a virtual UNI port to the authorized network service instance, to enable proper forwarding of subscriber traffic to or from the remote customer site 10r.

When the foreign domain BG 6b receives the reply message, the attached Policy Enforcement Point (PEP) 22 can use the traffic management information to determine compliance with the service agreement between the involved network operators, and set up traffic monitoring and accounting measurement capture mechanisms for the AVC defined by the newly assigned I-SID, as desired. If the traffic management information is in compliance with the service agreement between the operators, the foreign domain BG 6b then forwards the reply message to the host AG 8. When the host AG 8 receives the reply message it can install its trunk cross-connection function, as described above, and forward the reply message on to the AM 16. This gives the AM the information needed to extend the attachment circuit 14 as an AVC 18 to the AG. Note that in this embodiment the AM is not aware that AVC will not terminate on the AG as it would have when a local network service instance was requested. Once this process has been completed, a "success" message can be sent to the remote customer site 10r to indicate successful connection to the extended network service instance.

As may be appreciated, if the PEP 22 determines that the traffic management information is not in compliance with the service agreement, the PEP 22 may refuse to permit the extension of the network service to the remote customer site 10r. In such a scenario appropriate messaging (not shown) may be sent to the home authentication server 24 and/or the remote customer site 10r.

It should be noted that in a Provider Ethernet environment each realized instance of a network service has a distinct I-SID value assigned to it. This I-SID tag is carried on all packets belonging to the specific network service instance that are transported between BEBs. However the I-SID of an AVC that attaches a particular customer site to a BEB need not necessarily have the same value as that assigned to the network service instance attached too. In the embodiment described above with reference to FIGS. 2 and 4 different I-SIDs could be used in the home domain in the realization of the network service instance and the foreign domain in the realization of the Extended AVC. For example, the network service instantiated in the home domain will normally be assigned an I-SID, which is used to facilitate traffic forwarding in the home domain. Within the foreign domain, the respective I-SID assigned to each AVC is used to facilitate proper tunnelling of subscriber traffic through the trunk connections 20 between the foreign domain BG 6b and each involved host AG.

This is expected to be a common scenario, because autonomous domains will normally assign I-SIDs independently of each other. Changing I-SIDs as part of the virtual UNI port to service instance forwarding mapping function at the home domain BG 6a also facilitates proper traffic forwarding in cases where there are two or more remote customer sites within the foreign domain 4b hosted off the same AG, because proper traffic forwarding through the trunk cross connection function of the AG(s) hosting the remote customer sites can be guaranteed by using the respective I-SIDs assigned to the AVCs of those sites.

In some embodiments, it will be desirable to use the same I-SID to refer to the extended network service in both domains. The prime example of such an embodiment is a point-to-point connection service between one customer site in the home domain 4a and one remote customer site 10r in the foreign domain 4b. As may be appreciated, in such embodiments, the I-SID substitution function at the home BG 6 described above is not required, because there is no need to change the I-SID of subscriber traffic traversing the home domain BG 6a. On the other hand, it is necessary to negotiate a common I-SID that can be used in both domains.

Various methods may be used for the purpose. For example, the involved network operators may agree to define a set of I-SIDs which are to be used solely to identify extended network services. This set of reserved I-SIDs may, for example, be agreed upon as part of the above-noted service agreement between the two network operators. In such a scenario, the I-SID assigned to the service instance by the home domain will be selected from the list of reserved I-SIDs. It will be appreciated that in such an embodiment there is no need for the inclusion of an AM assigned I-SID in the AA-Request message as shown in FIG. 4. Rather by including the home domain assigned I-SID in the reply message propagated back to the host AG 8 in the foreign domain 4b (see FIG. 4), the foreign domain BG 6b, host AG 8 and AM 16 can update their respective forwarding tables to use the reserved I-SID of the service instance.

In the foregoing example, an extended network service is instantiated in a home domain, which is then tunnelled through an adjacent foreign domain to one or more remote customer sites. It will be recognised, however, that this same technique can be used to tunnel the extended services to remote customer sites in any desired number of adjacent foreign domains. Also in the foregoing example the interconnection between domains is realized by a single Inter-BG link. It will be recognised, however, that this same technique can be used when there is a plurality of BGs in each domain with a plurality of Inter-BG links interconnecting the domains and either specific AGs are trunked to specific BGs or the decision which BG to use for a specific remote site attaching to a specific network service instance is made at the time that the remote site is authenticated and authorized to attach. Finally the foregoing example deploys the trunk cross connect functionality at AG's to switch remote site traffic onto the trunk to the home domain BG. It will be recognized that the trunk may be portioned into trunk segments where the nodes joining one segment to the next also use the trunk cross connect functionality to steer customer packets form one segment to the next. In particular the aforementioned trunk may be segmented at the BG of the foreign domain with that BG deploying the trunk cross connection functionality. Also it will be recognised that the networking technology deployed to realize each trunk segment in a trunk is not required to be homogeneous and that the trunk cross connection functionality can be extended to map between diverse types of trunk.

The embodiment(s) of the invention described above is(are) intended to be exemplary only. The scope of the invention is therefore intended to be limited solely by the scope of the appended claims.

I claim:

1. A system for providing access to a network service instance hosted in a home network domain to customer site in a foreign network domain, the system comprising:
    a border gateway in the foreign network domain having a packet transport link to the home network domain;
    an access gateway in the foreign network domain; and
    a packet trunk extending from the home network domain over the packet transport link through the border gateway in the foreign network domain to the access gateway in the foreign network domain;
    wherein the access gateway is configured:
        to receive from the customer site in the foreign network domain a request to access the network service instance;
        to request authentication of the customer site from the home network domain; and
        in response to receiving authentication of the customer site from the home network domain, to establish an attachment virtual circuit between the customer site and the access gateway and to extend the attachment virtual circuit over the packet trunk, the extended attachment virtual circuit being identified within the packet trunk by a service instance identifier and being configured:
            to forward, on the extended attachment virtual circuit through the foreign network domain to the customer site, packet traffic received from the home network domain tagged with the service instance identifier, the forwarding being based, at least in part, on the service instance identifier; and
            to tag with the service instance identifier and then forward, on the extended attachment virtual circuit through the foreign network domain to the home network domain, packet traffic received from the customer site.

2. The system of claim 1, comprising an access multiplexer connected between the customer site and the access gateway of the foreign network domain, the access multiplexer being configured to assign the service instance identifier.

3. The system of claim 1, wherein the access gateway is configured to assign the service instance identifier.

4. The system of claim 1, wherein the access gateway is configured to receive the service instance identifier associated with the extended attachment virtual circuit from an authentication server of the home network domain.

5. The system of claim 1, wherein the access gateway is configured to receive the service instance identifier associated with the extended attachment virtual circuit in at least one authentication and authorization reply message.

6. The system of claim 1, wherein the same service instance identifier is associated with the extended attachment virtual circuit from the border gateway of the foreign network domain to an attachment point of the customer site in the foreign network domain.

7. The system of claim 6, wherein the access gateway is the attachment point of the customer site in the foreign network domain.

8. The system of claim 6, comprising an access multiplexer coupled to the access gateway in the foreign network domain, the access multiplexer being configured to be the attachment point of the customer site in the foreign network domain.

9. The system of claim 1, wherein the packet transport link is an Ethernet link.

10. The system of claim 1, wherein the packet transport link is a multi-hop trunk traversing a network domain other than the foreign network domain and the home network domain.

11. The system of claim 1, wherein the packet transport link is a provider backbone transport (PBT) trunk.

12. The system of claim 1, wherein the packet transport link is a provider backbone bridging (PBB) source-destination flow over an Ethernet link.

13. The system of claim 1, wherein the packet transport link is a provider backbone bridging (PBB) source-destination flow over a PBB network.

14. The system of claim 1, wherein the border gateway comprises a policy enforcement point (PEP).

15. The system of claim 14, wherein the PEP is configured to determine compliance with a service agreement between a network operator of the foreign network domain and a network operator of the home network domain.

16. The system of claim 15, wherein the PEP is configured to determine compliance with the service agreement between the network operator of the foreign network domain and the network operator of the home network domain based on traffic management information received from the home network domain.

17. The system of claim 14, wherein the PEP is configured based on traffic management information received in at least one authentication and authorization reply message.

18. The system of claim 13, wherein the PEP is configured to set up monitoring and accounting measurement capture mechanisms for the attachment virtual circuit.

* * * * *